United States Patent [19]

Seiger et al.

[11] 4,198,594
[45] Apr. 15, 1980

[54] METHOD OF CHARGING A VENTED ALKALINE ELECTROLYTE-CONTAINING ELECTROCHEMICAL CELL

[75] Inventors: Harvey N. Seiger, Waterford, Conn.; Thomas T. Terjesen, Westerly, R.I.

[73] Assignee: Yardney Electric Corporation, Pawcatuck, Conn.

[21] Appl. No.: 899,939

[22] Filed: Apr. 25, 1978

[51] Int. Cl.$^2$ .............................................. H02J 7/04
[52] U.S. Cl. ...................................... 320/43; 320/39; 320/46
[58] Field of Search ..................... 320/46, 32, 39, 43

[56] References Cited

U.S. PATENT DOCUMENTS

| | | | |
|---|---|---|---|
| 2,514,235 | 7/1950 | Genin et al. | 320/46 X |
| 3,798,528 | 3/1974 | Molyneux | 320/46 |

Primary Examiner—Robert J. Hickey
Attorney, Agent, or Firm—Donald E. Nist

[57] ABSTRACT

The improved method of the present invention comprises charging a vented alkaline electrolyte-containing electrochemical cell employing an electrode pair selected from the group consisting of nickel-zinc, nickel-cadmium, silver-zinc and silver-cadmium and at least periodic measuring the charging efficiency of the cell by determining the rate of gas evolution from the cell. The charging of the cell is terminated when the charging efficiency substantially decreases, signifying the cell having reached an about full charge. The charging efficiency at that point normally substantially decreases to a value of about $0.5 \pm 0.2$. In the alkaline electrolyte-containing cells, the charging efficiency is determined according to the formula $E = 1 - (15.8/I)\dot{v}$ wherein E is the charging efficiency, I is the current in amperes and $\dot{v}$ is the gas generation rate in the cell in cc per second. The improved method prevents overcharging of the cell and accurately determines when an about full charge is reached. Accordingly, charging can be carried out without risk of damage to the cell and with the greatest efficiency.

9 Claims, 1 Drawing Figure

TIME ON CHARGE (HOURS)
15A CHARGE RATE (80AH CELL)

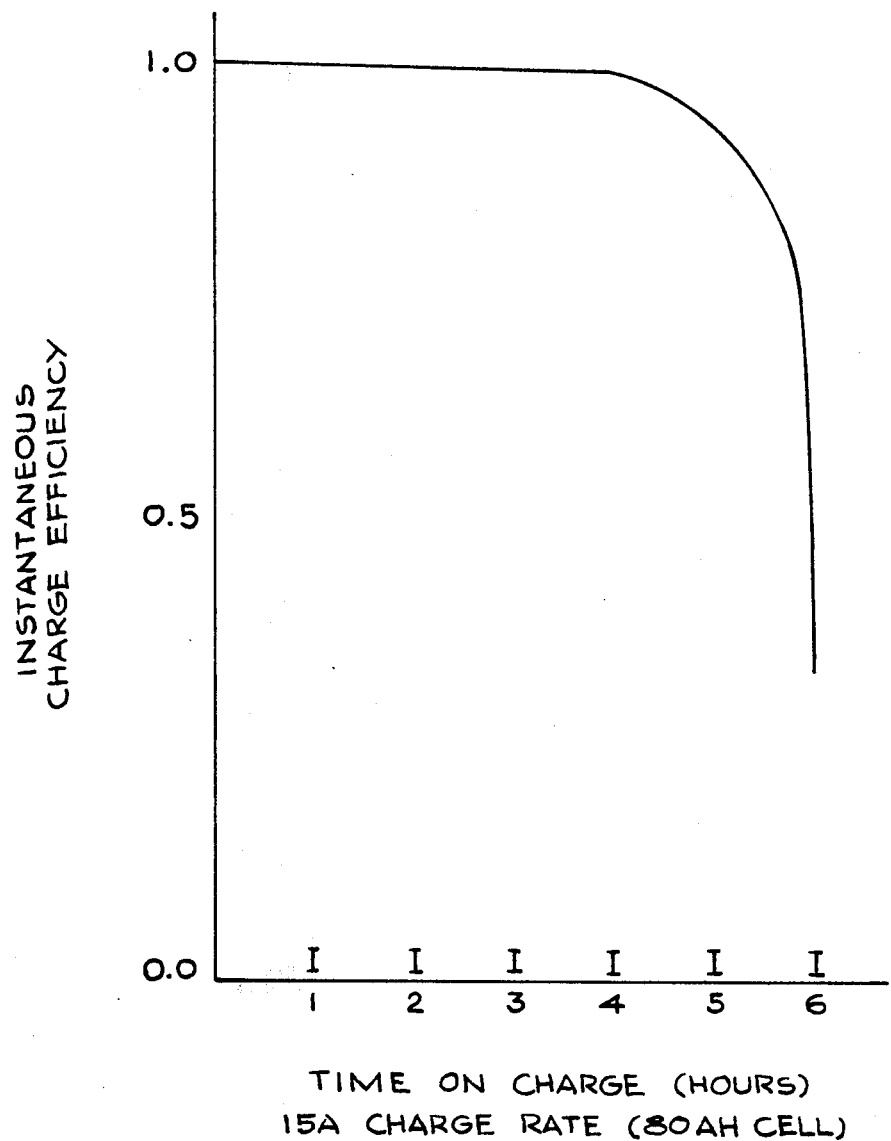

4,198,594

METHOD OF CHARGING A VENTED ALKALINE ELECTROLYTE-CONTAINING ELECTROCHEMICAL CELL

BACKGROUND OF THE INVENTION

1. Field of the Invention

The present invention generally relates to electrochemical cells and more particularly to an improved method of charging vented alkaline electrolyte-containing electrochemical cells.

2. Prior Art

In certain electrochemical systems, particularly those having alkaline electrolytes, determination of the state of charge cannot be reliably ascertained except by discharging the cell. Obviously this is undesirable since in most circumstances a fully charged cell is wanted. If the battery or cell is charged without being able to determine when the full charge occurs, there is a danger of overcharge and impairment of the cell.

In the case of a closed cell, for example, employing nickel oxide and cadmium electrodes or the like, if the cell is charged at a relatively low rate, generation of oxygen at the nickel oxide electrode normally is matched by oxygen consumption at the cadmium electrode so that the oxygen gas pressure in the cell does not build up to a dangerous level. If a higher charge rate is used, however, dangerous oxygen build-up can occur and may result in an explosion. However, such a closed system can employ an auxiliary electrode to signify the pressure condition in the cell and thus dictate other interruption of the charging or a reduction in the charging rate whenever the gas pressure in the cell exceeds a predetermined level. Such safety procedure is not available when a vented or semi-sealed cell is used. Such cells employ mobile electrolyte and changes in the electrolyte level do not permit a reliable signal.

Accordingly, there is a substantial need for an improved method of detecting the charged condition of a vented electrochemical cell during the charging procedure and of preventing overcharging of the cell.

SUMMARY OF THE INVENTION

The foregoing needs have been satisfied by the improved method of the present invention for charging a vented alkaline electrolyte-containing cell in such manner that an about full charge can be provided to the cell without overcharging the cell. The method precludes the possibility of damage to the cell and waste of charging current. The method is substantially as set forth in the Abstract above. Thus, the method employs during the charging procedure an at least periodic measuring of the charging efficiency by reference to the rate of gas generation in the cell. When the charging efficiency of the cell suddenly substantially decreases, this signifies that the cell has reached an about full charge and that the charging procedure should be terminated. Specifically, when the charging efficiency decreases to a value not in excess of about 0.7 or roughly $0.5\pm0.2$, the charging procedure is terminated. The charging efficiency can be calculated by the formula $E=1-(15.8/I)\dot{v}$ where E is the charging efficiency, I is the current in amperes and $\dot{v}$ is the gas generation rate in cc per second utilizing the present method. With the present method charging can be carried out relatively rapidly without risk, since the precise time to stop the charging can be easily determined throughout the charging. The detection of the rate of gas generation can be easily accomplished through the use of an eudiometer tube or a flow sensor or a thermocouple gauge. Further features of the present invention are set forth in the following detailed description and accompanying drawings.

DRAWINGS

The single FIGURE is a graph depicting the variation of charge efficiency during charge of a vented alkaline electrolyte-containing cell of the nickel-zinc type.

DETAILED DESCRIPTION

The improved method of the present invention involves charging a vented alkaline electrolyte-containing electrochemical cell. The cell employs an alkaline electrolyte such such as potassium hydroxide, sodium hydroxide or the like. The cell also employs an electrode pair selected from the group consisting of nickel-zinc, nickel-cadmium, silver-zinc and silver-cadmium. Preferably, the electrode pair comprises a nickel electrode and a zinc electrode.

In accordance with the present method, during the charging procedure (which can be carried out in any conventional manner) the charging efficiency of the cell is at least periodically measured. This charging efficiency is determined from the charging current and the rate of gas generation in the cell. The formula is $E=1-(15.8/I)\dot{v}$ where E is the charging efficiency, I is the current in amperes and $\dot{v}$ is the rate of gas generation in the cell in cc per second. The gas generation rate is detectable by utilizing a simple eudiometer tube which collects gas in a conventional manner. Alternatively, a flow sensor can be used for such purposes, which sensor measures the gas flow rate in terms of a pressure drop in the sensor tube. If desired, the gas flow rate can be measured by a thermocouple gauge which determines the gas rate by sensing the rate of dissipation of heat from the measured region. Other equally adaptable conventional means of measuring gas flow rates can be employed to measure the gas flow rate from the electrochemical cell during this charging procedure. In each instance, the gas generation rate detecting device can be connected to the cell vent and employed while the cell is in operation.

Further in accordance with the method of present invention, the charging of the cell is terminated when the charging efficiency substantially decreases. It has been determined that the charging efficiency stays approximately level during most of the charging but that as the cell approaches full charge, the charging efficiency substantially decreases. The graph of the single FIGURE shows this.

Thus for approximately 85 percent of the charging time, the charging efficiency remains at about 1.0. Thereafter it slowly decreases to about 0.75, whereupon it plunges precipitously to 0. While the particular curve depicted in the graph of the single FIGURE is one which was determined on a vented conventional nickel-zinc cell employing a 35% KOH solution as electrolyte and a charging current and rate of 15A for an 80 AH cell, similar curves are obtained for the other electrode pairs specified herein, namely, nickel-cadmium, silver-zinc and silver-cadmium, at various charging currents (rates). The cell used in the tests shown in the graph is more particularly described as having sintered positive electrodes, pasted negative electrodes and a conventional tripartite separator system. The positive electrodes were approximately 40 mils thick and used in a back-to-back configuration. When the charging efficiency decreases to a level of about 0.7, this indicates that the cell is about fully charged and the charging is thereupon terminated. The charging efficiency is determinable as indicated above by the above described formula. Thus, the method results in fully charged cells without waste of charging energy.

When the charge is cut off in accordance with the present method, the amount of charge stored in the negative electrodes is greater than the amount of charge stored in the positive electrodes. This difference, however, is less than would be encountered in other methods of charge cut-off. Moreover, there is a discharge from any zinc electrode present so that the difference in charge as stored between the two electrodes where one is zinc is further decreased. The present method has the advantage of minimizing the reconditioning of the cell which is needed to re-equalize the performance of the electrodes in the cell.

Hydrogen evolution due to self-discharge of the zinc electrode can cause a low value for the charging efficiency but this effect is usually very small and can be ignored. If the effect is larger due to shape change, fading or other factors, the charge should be still cut off when the apparent charge efficiency decreases to 0.7 or the like.

The electrolyte level somewhat decreases during the charging and there may be a reaction between the oxygen gas generated and the negative electrode. This can lead to a spurious high value for the charging efficiency. However, this occurs only while the oxygen generation rate is low. Thus, when the charging efficiency starts to change rapidly, that is, decrease rapidly near the end of the charge, the small increase in measured value for the charging efficiency due to the reaction between generated oxygen and the negative electrode is not a significant error because of the rate of change of the charging efficiency. The present method despite the noted possible errors in calculating the charging efficiency, is unaffected to any significant extent by such errors and performs satisfactorily.

The present method is improved over prior charging procedures for vented alkaline electrolyte-containing cells and provides the desired results simply, efficiently and reproducibly. Various changes, modifications, alterations and additions can be made in the method of the present invention, its steps and parameters. All such changes, modifications, alterations and additions as are within the scope of the appended claims form part of the present invention.

What is claimed is:

1. An improved method of charging a vented alkaline electrolyte-containing electrochemical cell to about full charge without overcharging the same, said method comprising:
   a. charging a vented alkaline electrolyte-containing electrolyte cell at about a constant current and during said charging at least periodically measuring the charging efficiency of said cell in accordance with the formula $E=(1-15.8/I)\,V$ where I is the charging current in amperes and V is the gas generation rate in cc per second by determining the rate of gas generation in said cell and the charging current; and,
   b. terminating said charging of said cell when said charging efficiency substantially decreases, signifying an about full charge on said cell.

2. The improved method of claim 1 wherein said cell employs an electrode pair selected from the group consisting of nickel-zinc, nickel-cadmium, silver-zinc, and silver-cadmium.

3. The improved cell of claim 2 wherein one of said electrodes is nickel and the other of said electrodes is zinc.

4. The improved method of claim 2 wherein one of said electrodes is nickel and the other of said electrodes is cadmium.

5. The improved method of claim 2 wherein one of said electrodes is silver and the other of said electrodes is zinc.

6. The improved method of claim 2 wherein one of said electrodes is silver and wherein the other of said electrodes is cadmium.

7. The improved method of claim 3 wherein said charging is terminated when said charging efficiency drops to a value of not in excess of about 0.7.

8. The improved method of claim 7 wherein said charging is terminated when said charging efficiency drops to a value of about $0.5\pm0.2$.

9. The improved method of claim 1 wherein said measuring of said charging efficiency is carried out continuously during said charging.